United States Patent [19]

Chalfant, Jr.

[11] Patent Number: 4,465,201
[45] Date of Patent: Aug. 14, 1984

[54] CONICAL O-RING SEAL

[75] Inventor: Gordon G. Chalfant, Jr., North Augusta, S.C.

[73] Assignee: The United States of America as represented by the United States Department of Energy, Washington, D.C.

[21] Appl. No.: 462,155

[22] Filed: Jan. 28, 1983

[51] Int. Cl.³ .............................................. B65D 53/02
[52] U.S. Cl. ...................................... 220/3; 220/316; 220/378
[58] Field of Search .................. 220/3, 241, 242, 304, 220/316, 358, 361, 378

[56] References Cited

U.S. PATENT DOCUMENTS

| | | | |
|---|---|---|---|
| 2,016,223 | 10/1935 | Bowers | 220/3 X |
| 2,348,293 | 5/1944 | Hamer | 220/378 X |
| 2,596,353 | 5/1952 | Zollinger | 220/316 X |
| 2,889,069 | 6/1959 | von Fuchs | 220/39 |
| 3,128,009 | 4/1964 | Norton | 220/316 |
| 3,484,317 | 12/1969 | Dickerson | 156/175 |
| 3,613,939 | 10/1971 | Ehle | 220/46 |
| 3,693,822 | 9/1972 | Thillet | 220/3 |
| 4,195,457 | 4/1980 | Kissling et al. | 52/224 |

Primary Examiner—Steven M. Pollard
Attorney, Agent, or Firm—Allen F. Westerdahl; Michael F. Esposito

[57] ABSTRACT

A shipping container for radioactive or other hazardous materials which has a conical-shaped closure containing grooves in the conical surface thereof and an O-ring seal incorporated in each of such grooves. The closure and seal provide a much stronger, tighter and compact containment than with a conventional flanged joint.

6 Claims, 6 Drawing Figures

CONICAL O-RING SEAL

The United States Government has rights in this invention pursuant to Contract No. DE-AC09-76SR00001 between the U.S. Department of Energy and E. I. duPont de Nemours & Co.

BACKGROUND OF THE INVENTION

1. Field of the Invention and Contract Statement

The invention relates to shipping containers for radioactive or other hazardous materials, and more particularly to closures and seals for such shipping containers.

2. Discussion of Background and Prior Art

Some of the shipping containers for radioactive and hazardous materials use closures which embody flanged joints. Such closures are somewhat bulky and do not provide the degree of strength desired due to the nature of the materials to be shipped.

Attention is drawn to U.S. Pat. Nos. 4,195,457, 3,693,822, 3,613,939, 3,484,317 and 2,889,069.

SUMMARY OF THE INVENTION

An object of the invention is to provide a shipping container for radioactive and other hazardous materials. Another object of this invention is to provide a seal and a closure for such shipping container. A further object of the invention is to provide a light-weight, strong closure for use on radioactive containment vessels. Other objects and advantages of the invention are set out herein or are obvious herefrom to one ordinarily skilled in the art.

The objects and advantages of the invention are achieved by the process of the invention.

To achieve the foregoing and other objects and in accordance with the purpose of the invention, as embodied and broadly described herein, the invention involves a shipping container for radioactive materials and other hazardous materials having a conical-shaped closure containing one or more grooves in the conical surface thereof, with an O-ring seal incorporated in each of the grooves.

More narrowly, the invention involves new closure means for a vessel for radioactive or hazardous material, the vessel having a generally cylindrical body member having walls defining an internal chamber adapted to contain the hazardous material. There is a removable end closure means at the upper end of the internal chamber. The invention deals with improved sealing means for the end closure means. The invention sealing means includes a closure receiving portion disposed in the upper end of the internal chamber. The closure receiving portion is generally frusto-conically shaped and tapers downwardly and inwardly in the wall of the internal chamber. There is a removable end closure member adapted to fit in frusto-conical mating relationship with the closure receiving portion. The end closure member has at least one circumferential groove in the conical surface thereof adapted to receive an O-ring seal. There is also means adapted to secure the end closure member in the closure receiving portion of the internal chamber. Since the grooved surface of the end closure member does not rotate in relation to the cylindrical body member during sealing and unsealing, the life of the O-ring is much longer than the prior art devices.

Preferably a plurality of parallel circumferential grooves, each adapted to receive an O-ring seal, are disposed in the end closure member. The means adapted to secure the end closure member is preferably a threaded plug member adapted to mate with a threaded portion of the wall above the closure receiving portion of the internal chamber. Preferably, to effect complete and tight closure, the plug member is tightened until there is a metal-to-metal contact between the end closure member and the closure receiving portion, and each of the O-ring seals is deformed into the corresponding circumferential groove. The end closure means preferably includes a leak detection means. Preferably the leak detection means is composed of a cavity disposed in the central portion of the end closure member, a passageway connecting the cavity to a point on the conical surface above the circumferential groove, and means connected to the cavity to detect any leakage from the vessel.

The conical O-ring closures of the invention are designed to be used with metallic pressure vessels and are generally stronger than the walls of the pressure vessels to which they are attached. The invention closures provide sealing conditions which can withstand high internal pressure of 1000 psi from a high temperature of 500° F. to a low temperature of −40° F., for example. The sealing surfaces do not rotate upon closure, but are compressed together. This provides for excellent O-ring life. Rotation would tend to turn and twist the O-ring during sealing and would scar the O-ring surface if there were any defects on the receiving sealing surface.

The O-ring sealing arrangement of the invention is more reliable than if a deformable metal foil was used in place thereof (by interposing the deformable metal foil between the two facing, mating conical surfaces). Deformable metal foil is not elastic and resilient, is difficult to correctly insert and is easily ripped, overfolded, etc. The O-ring sealing arrangement of the invention provides a sealing means that progressively more tightly seals. This is due to the two facing, mating conical surfaces. Two vertical surfaces do not provide progressive compression of an O-ring positioned therebetween.

The conical seal of the invention is particularly effective for shipping containers for radioactive heat sources.

Reference will now be made in detail to the present preferred embodiment of the invention, an example of which is illustrated in the accompanying drawings.

A BRIEF DESCRIPTION OF THE DRAWINGS

The accompanying drawings, which are incorporated in and form a part of the specification, illustrate the invention and, together with the description, serve to explain the principles of the invention.

DETAILED DESCRIPTION OF THE INVENTION

All parts, percentages, ratios and proportions are on a weight basis unless otherwise stated herein or obvious herefrom to one ordinarily skilled in the art.

Figure 1:
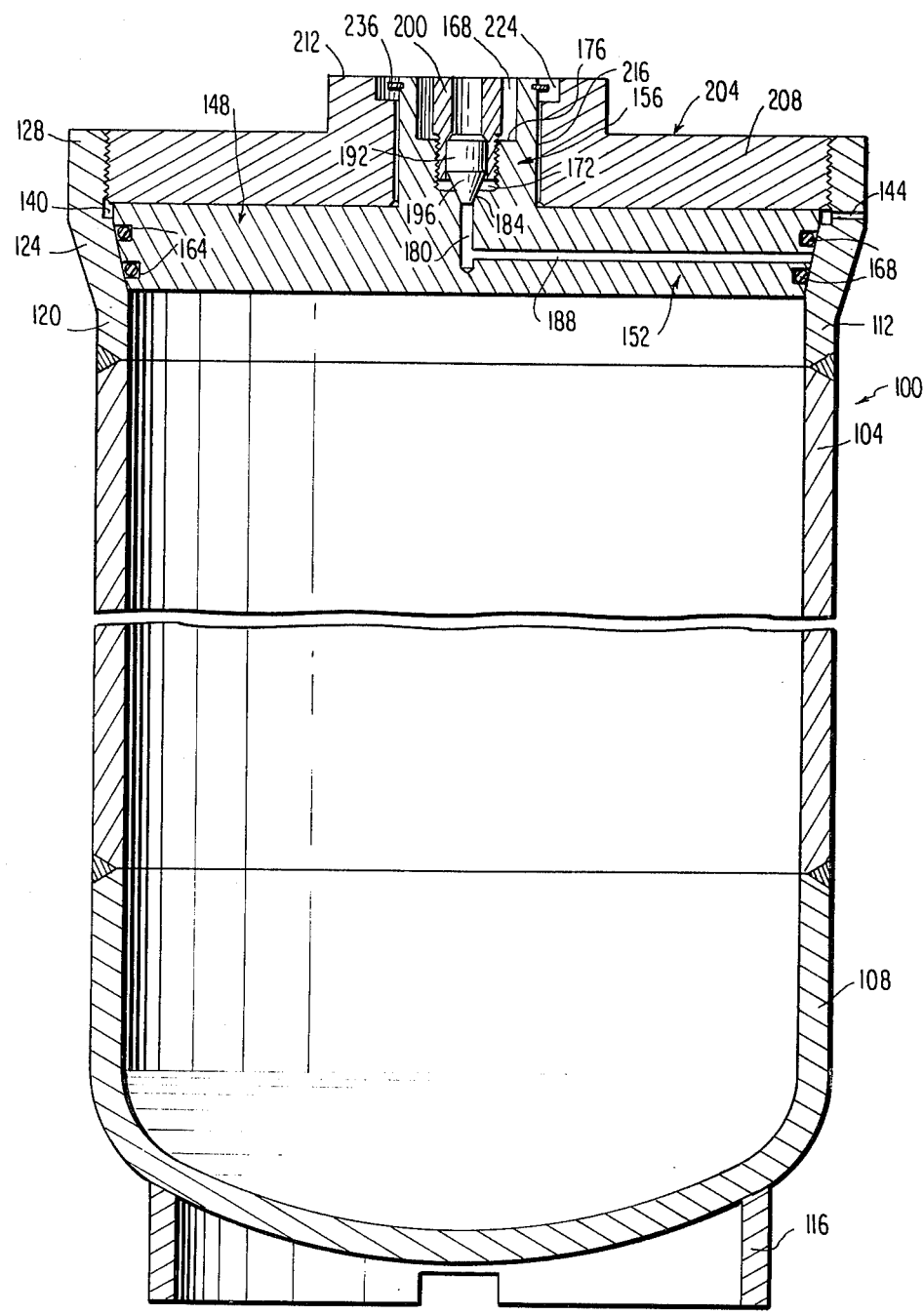
FIG. 1 is a longitudinal cross-sectional view of one embodiment of the conical O-ring seal of the invention in conjunction with a shipping container.

FIG. 1 illustrates an embodiment of the conical O-ring seal and shipping vessel (or container) of the invention. Containment vessel 100 includes cylindrical segment 104, bottom segment 108, which is welded to the bottom edge of cylindrical segment 104, and top segment 112, which is welded to the top edge of cylindrical segment 104. For a primary containment vessel, containment vessel 100 typically has a height of 12.75 inches, an inside diameter of 5.047 inches and an outside diameter of 5.563 inches. For a secondary containment vessel, containment vessel 100 typically has a height of 18.50 inches, an inside diameter of 6.065 inches and an outside diameter of 6.625 inches. Containment vessel 104 is, for example, constructed of type 304 stainless steel, annealed condition (any suitable stainless steel or other suitable metallic material can be used), and can readily have a design pressure of 1000 psig at 500° F. Pipe segment stand (ring) 116 is mounted on the bottom of containment vessel 100 to vertically support the vessel and prevent rotation during closure tightening.

Figure 2:
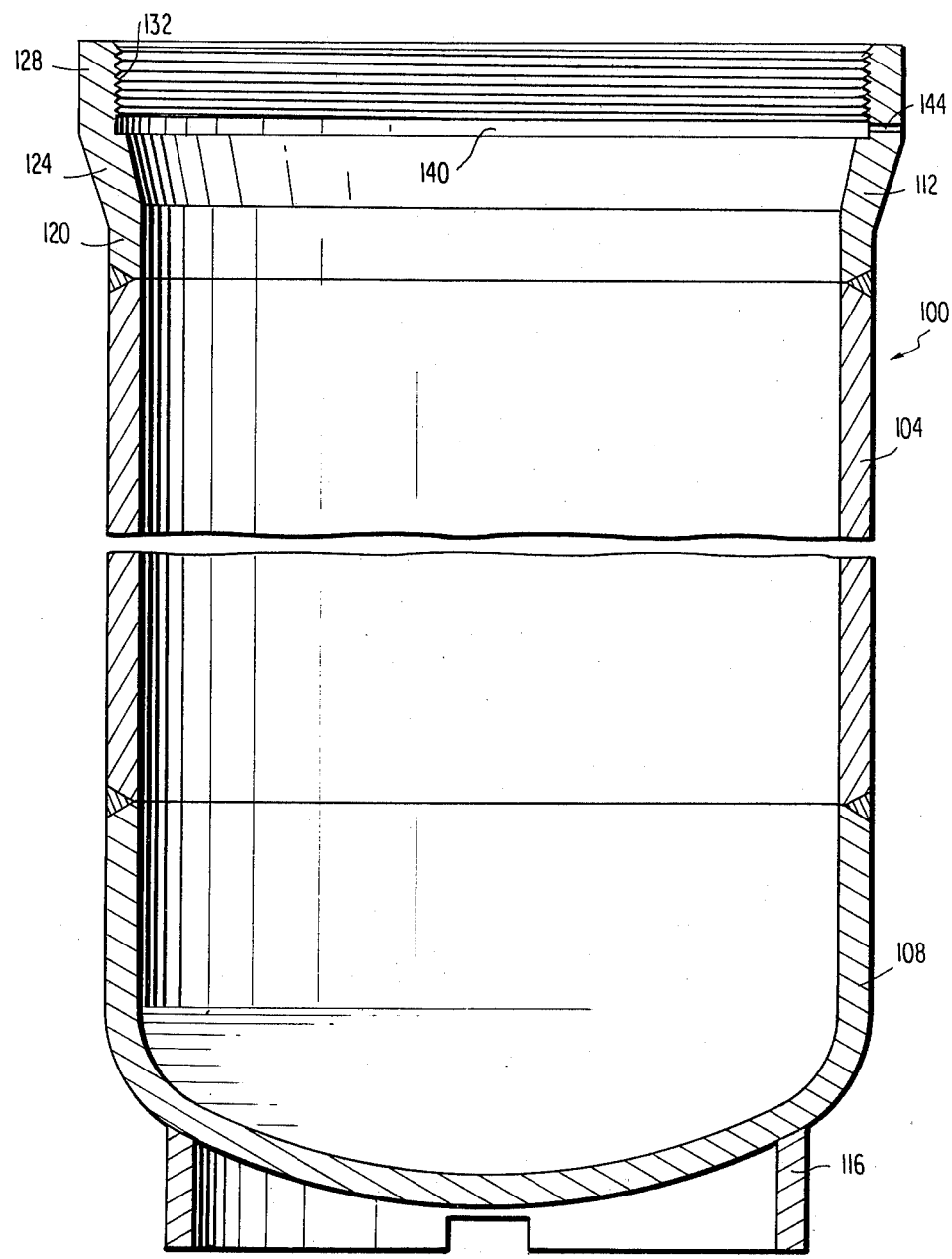
FIG. 2 is a longitudinal cross-sectional view of the shipping container of FIG. 1.
Figure 6:
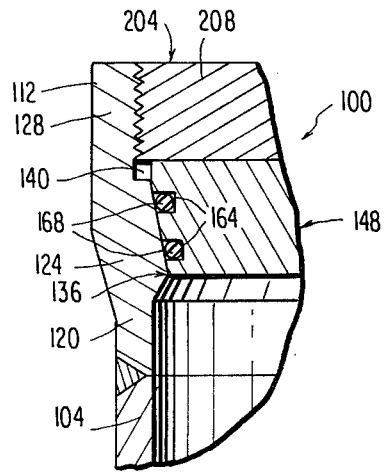
FIG. 6 is a partial, longitudinal cross-sectional view of another embodiment of the invention.

As best seen in FIG. 2, top segment 112 of containment vessel 100 flairs outwardly. Top segment 112 has lower portion 120, which has the same internal and outside diameters as does cylindrical segment 104, middle portion 124, which slants outwardly and upwardly, and upper portion 128, which is vertical in alignment. Upper portion 128 is internally threaded (132). The inner surface of middle segment 124 is outwardly and upwardly slanted at an angle of, typically, 10 degrees off of the vertical. FIGS. 1 and 2 show the secondary container embodiment. FIG. 6 shows the primary container embodiment, wherein the inner surface of middle segment 124 is moved inwards to form bottom lip 136. Internal groove 140 is located on the internal surface of top segment 112 at the intersection of middle segment 124 and top segment 128. Horizontal passageway 144 in top segment 124 is in communication with internal groove 140. Horizontal passageway 144 and internal groove 140 form part of the pressure vent system to relieve pressure in the event the closure is disassembled while the vessel is pressurized.

Figure 4:
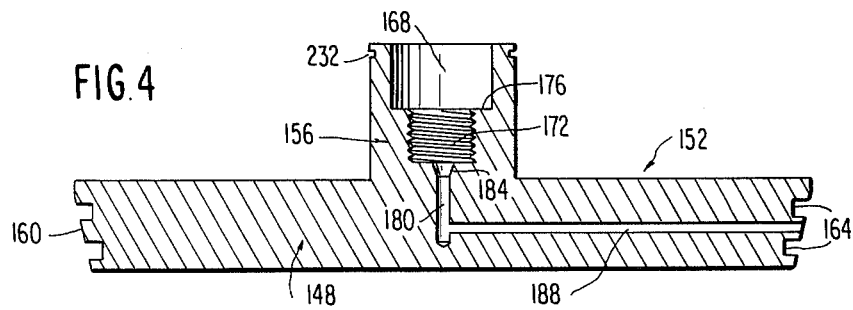
FIG. 4 is a vertical cross-sectional view of the end closure means of FIG. 1.
Figure 5:
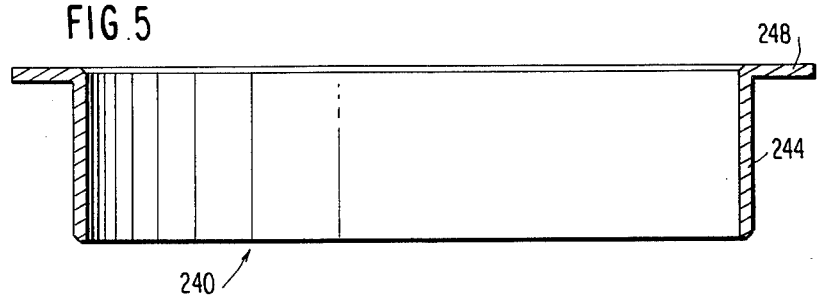
FIG. 5 is a vertical cross-sectional view of the protective collar of FIG. 1.

Cone seal 148, as best shown in FIG. 4, has bottom disc section 152 and top cylindrical section 156, the vertical central axis of both of which are coextensive. The lower major portion 160 of the outer rim of bottom disc section 152 is inwardly and downwardly slanted, typically at an angle of 10 degrees off of the vertical. As shown in FIG. 1, bottom disc section 152 fits inside of middle portion 124 of top segment 124, with the slanted surfaces closely engaging in a mating manner. Lower surface portion 160 contains two O-ring grooves 164. O-rings 168 are positioned in O-ring grooves 164.

Top cylindrical section 156 of cone seal 148 is hollow, having wide top passageway (bore) 168 and narrower bottom passageway (bore) 172, which is internally threaded. The interface of top passageway 168 and bottom passageway 172 is horizontal rim 176. Central, vertical passageway 180 in disc section 152 is in communication with bottom passageway 172 and is outwardly flared (184) on its top region. Horizontal passageway 188 in disc section 152 extends from the rim of the latter, exiting between grooves 164, to central, vertical passageway 180. A leak in either of O-rings 168 is preferably detected by pressurizing the cavity, passageways 180 and 188, and measuring the rate of pressure drop. [A leak in the lower of O-rings 168 can be detected via passageways 180 and 188. A leak in the upper of O-rings 168 can be detected via internal groove 140 and passageway 144.] The conventional leak detection means is not shown in the drawings. Referring to FIG. 1, plug 192 has a lower conical portion 196 which is positioned to removably block the upper conical segment 184 of vertical passageway 180. Gland nut 200 is externally threaded on its lower external end and thereby removably holds plug 192 in place.

Figure 3:
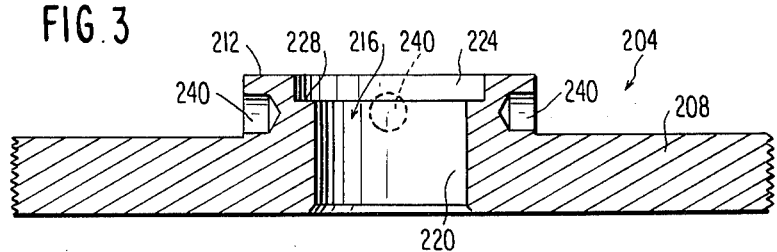
FIG. 3 is a vertical cross-sectional view of the threaded retaining means of FIG. 1.

Cone seal nut 204 has lower disc portion 208 and upper cylindrical portion 212. Cone seal nut 204 is preferably constructed of Armco Nitronic 60 stainless steel to resist galling when threading into vessel 100. Central bore 216 has lower passageway 220, upper passageway 224 and rim 228 (FIG. 3). The external rim of lower disc portion 208 is externally threaded. As shown in FIG. 1, cone seal nut is threaded into place and holds cone seal 148 in sealing engagement with containment vessel 100. Groove 232 in top cylindrical section 156 contains retaining ring 236, which holds cone seal nut 204 and cone seal 156 together in a rotatable manner. Four vertical bores 240 in upper cylindrical portion 212 allow the insertion of a tool to tighten or untighten cone seal nut 204.

Protection collar 240, having cylindrical portion 244 and extended lip 248, fits into the upper portion 112 of container vessel 100 when cone seal 148 and gland nut 204 are not inserted therein.

Preferably elastomeric O-rings are used, such as, those made of Viton "GLT" (per Parker Compound V835-75).

The conical O-ring seal of the invention is very strong, has leakage rates comparable to a welded joint, and is servicable up to 600° F. (which is 200° F. above the manufacturer's rating for Viton O-rings). Closures have long been the weak point of shipping containers, but this problem is overcome by the invention. The design of shipping containers is based on the ASME Code, except for the closure which is left to the designers.

One of the features of the conical O-ring seal of the invention is its simplicity. All of the components are easily replaced and do not increase the overall size of the package (as flanges do). An O-ring is the simplest way to seal a joint as long as it can be contained. The seal is adaptable to almost any size cylindrical vessel.

For high pressure application, the closure can be made stronger than the containment vessel wall. Reference containers were hydrotested at 1800 psig and tested at elevated temperatures with 1000 psig internal pressure. This type of closure has been tested up to 60,000 psig at room temperature with deuterium gas and had no detectable leakage. The seal has very low leakage rates. Leakage rates (referenced to standard conditions) measured at 1000 psig helium before and after 600° F. explosure for 4 hours were less than the background of $2 \times 10^{-8}$ std. cc/sec.

The seal has a leakage test port. The "conical O-ring seal" has its own leakage detection port to meet the requirements of ANSI N14.5, Paragraph 6.4. Such simplifies the equipment required to meet NRC post-loading leakage test requirements.

The seal of the invention can be used with high temperature applications. O-ring manufactures only rate Viton "GLT" elastomers servicable to 400° F. (Parker O-ring Catalog 5700, page 2-5). This is because the O-ring loses strength above 400° F. and extrudes from the force of the pressure out through the clearances in the closure. With the conical seal of the invention essentially no clearance is present. The vessel material is selected to have the same thermal coefficient of expansion. Typically the closure is originally tightened to achieve metal-to-metal contact with a cone slope of 1:10, in which case the gland nut must be deformed 0.010 inch due to pressurization before a crack of 0.001 inch in the seal area is formed. Therefore, at elevated temperatures, the O-ring is completely contained within the closure. The conical seal was tested for 4 hours at 600° F. without any loss of containment, and was tested to failure at 785° F. and 1000 psig.

The conical closure of the invention has certain advantages over conventional-flanged closures. The invention closure scheme, for a particular vessel would increase the outside diameter by 178 inch, whereas for the same vessel a conventional flanged closure would increase the outside diameter by 8⅜ inches (15" O.D.-6.625" Nominal). The size of the vessel is very important for insulated radioactive shipping packages. When required to have 6 inches of insulation for thermal protection in the event of a fire, the reduced outside diameter requires less insulation, smaller package, more packages per transport vehicle, etc. The conventional-flanged closure used for compression is a 6 inch-900 pound flange described in Turn Catalog 311, p. 147. The invention cone closure is rated for 1000 psig service and weighs just 13 pounds, whereas the 900 psig service flanges weight 216 pounds. In the shipping business, weight costs money, both initially during fabrication and every time it is loaded and moved. The invention cone closure has proven absolutely leak tight when tested in accordance with ANSI N14.5 ($<10^{-7}$ atm cc/sec). The seal is also redundant in the event one O-ring fails. It is difficult to make conventional flanges leak tight to $10^{-4}$ atm cc/sec. The invention closure has only one nut to turn to a prescribed mark for sealing. The flanged closure has twelve 1⅛ inch diameter bolts which must be tightened to a pre-determined torque in a tightening sequence. The invention closure is self aligning upon assembly; with the flanged closure, one must align the gasket and two flanges radially, and insure that the sealing surfaces are tightened parallel to each other. The invention closure is reusable, and no upsetting of the gasketed surfaces should occur—the consumable item is, e.g., a commercial O-ring of Viton. Because of the high bolt pressure required to obtain the seal, gasket surfaces are easily damaged in the flanged closure scheme. The invention closure is stronger than the wall of attached vessel. Hydro failure in one test resulted in failure at 8000 psi in the pipe wall, but the invention closure had not been permanently deformed. In the event of overpressure, the bolts in the conventional flanged joint will elongate thereby loosening the seal. In radioactive material shipping packages containment of the material is very important. Therefore, a closure that will not fail until a pressure of 8X its rating is far superior to one that has bolt yielding, allowing increasing leakage at slightly over its intended rating. An ability to be leakage tested after assemble is an important advantage. The dual O-rings of the invention closure have a leakage test port between them. The invention closure can be leak tested without pressurization of containment vessel and radioactive contents. With the flanged closure scheme the entire vessel must be pressurized, which requires a separate port, and is very undesirable for radioactive packages.

The ability to seal at elevated temperatures is also important. The invention closure is made of like material, therefore thermal expansion is minimum. In the event that expansion does occur, the slope of 1/10 or 20° reduces clearances for O-ring extrusion and reduces closure failure. With flanged closures, elevated temperatures cause thermal expansion problems between bolts and flanges—this results in clearances forming in the sealing surfaces and allows gasket blow out.

By way of summary, the invention involves a shipping container for radioactive materials and other hazardous materials having a conical-shaped closure containing one or more grooves in the conical surface thereof, with an O-ring seal incorporated in each of the grooves.

The foregoing prescription of preferred embodiments of the invention has been presented for purposes of illustration and description. It is not intended to be exchaustive or to limit the invention to the precise form disclosed, and obviously many modifications and variations are possible in light of the above teachings. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A vessel for containing hazardous material, comprising:
   a body having a chamber therein;
   a closure member adapted to seal said chamber;
   said chamber being open and having a rim adapted to receive said closure member in sealing engagement therewith;
   said closure member having a frustro-conical periphery, and said rim having a frustro-conical interior adapted to mate with said periphery of said closure member;
   said periphery of said closure member having a first circumferential endless groove and a second circumferential endless groove therein; said first circumferential endless groove and said second groove each being adapted to receive an O-ring;
   said closure member having a first test port communicating with an opening in said periphery of said closure member between said grooves and with an exterior portion of said closure member;
   a plug adapted to seal said first test port;
   an O-ring received in said first circumferential endless groove;
   an O-ring received in said second circumferential endless groove;
   said first circumferential endless groove being nearer said chamber than said second circumferential endless groove while said closure is in sealing engagement;
   a means for retaining said closure member in sealing engagement with said rim;
   said rim having an internal circumferential groove therein adjacent said closure member while in sealing engagement; said internal circumferential groove being further from said chamber than said second circumferential endless groove, and being adapted to receive leakage passing said second circumferential endless groove; and a second test port including a passageway in said rim in communication with said internal circumferential groove;

whereby sealing of said chamber by said closure member can be tested by detecting leakage from said chamber, when pressurized, past said first circumferential endless groove at said first test port, and by detecting leakage past said second circumferential endless groove at said second test port.

2. A vessel as claimed in claim 1, wherein said rim and said means for retaining have mating threads adapted for screw engagement;

whereby said means for retaining can be rotated to apply seating force against said closure member.

3. A vessel as claimed in claim 1, wherein said closure member further comprises a raised area extending above a side of said closure member opposite said chamber; said raised area surrounding said first test port and being adapted to receive said plug in sealing engagement with said first test port;

said means for retaining having a hole therethrough adapted to receive said raised area;

whereby said plug is removable without removing said means for retaining.

4. A vessel as claimed in claim 3, wherein said means for retaining is a disk having a raised portion surrounding said hole;

said first test port further comprises a first passage extending into said closure member from said side of said closure member opposite said chamber, and a second passage intersecting said first passage, said second passage lying within said closure member and terminating at said opening in said periphery of said closure member;

and further comprising a plug retainer which is selectively operable to retain said plug in sealing engagement with said first port, said plug retainer being adapted to be received within said raised area of said closure member.

5. A vessel as claimed in claim 4, wherein said body has cylindrical side walls and a bottom wall;

said rim has an outer diameter which progressively is larger in a direction away from said chamber;

said rim and said means for retaining have mating threads adapted for screw engagement;

said O-rings being of elastomeric material;

whereby a sealing engagement is caused between said O-rings and said rim by rotation of said means for retaining relative to said rim, which forces said closure member into sealing engagement with said rim.

6. A vessel as claimed in claim 5, wherein said body comprises stainless steel adapted to withstand high pressure for containing hazardous wastes;

whereby said body, when in sealing engagement with said closure member, seals properly to at least 1000 psig and 500° F.

* * * * *